United States Patent [19]

Galbraith, Jr.

[11] 4,348,749
[45] Sep. 7, 1982

[54] PHASE CORRECTING SEISMIC TRACES

[75] Inventor: James N. Galbraith, Jr., Dallas, Tex.

[73] Assignee: Mobil Oil Corporation, New York, N.Y.

[21] Appl. No.: 591,914

[22] Filed: Jun. 30, 1975

[51] Int. Cl.³ .............................................. G01V 1/28
[52] U.S. Cl. ....................................... 367/46; 367/48; 367/63
[58] Field of Search ......... 340/17, 15.5 TA, 15.5 TC, 340/15.5 TD, 15.5 DP, 15.5 CP, 15.5 F; 444/1; 367/38, 40, 43, 48, 46, 63; 364/421

[56] References Cited

U.S. PATENT DOCUMENTS 3,689,874 9/1972 Foster et al. ................... 340/15.5 F

OTHER PUBLICATIONS

Inverse Convolution Filters, Rice, *Geophysics*, vol. XXVII, No. 1, Feb. 62, pp. 4–18.
Prediction Error as a Criterion for Operator Length, Galbraith, *Geophysics*, vol. 36, No. 2, Apr. 1971, pp. 261–265.
Principles of Digital Filtering, Robinson et al., *Geophysics*, vol. XXIX, No. 3, Jun. 1964, pp. 395–404.

*Primary Examiner*—Howard A. Birmiel
*Attorney, Agent, or Firm*—Charles A. Huggett; Michael G. Gilman; Frank J. Kowalski

[57] ABSTRACT

This specification discloses a system and method for processing deconvolved seismic traces to compensate for phase distortion introduced in deconvolving the traces. The method provides for automatically processing the traces in an automatic data processing machine. A filter is generated from the signal pulse of the seismic energy applied to the earth in obtaining the seismic traces and this filter is applied to the deconvolved seismic traces to phase correct the traces.

13 Claims, 5 Drawing Figures

PHASE CORRECTING SEISMIC TRACES

BACKGROUND OF THE INVENTION

This invention is directed to the method and apparatus for removing phase distortion from seismic traces or data, which method and apparatus are particularly applicable for removing phase distortion from deconvolved seismic data, and, still more particularly, from seismic data which has been deconvolved with a minimum phase inverse operator.

In seismic prospecting a seismic energy source is employed to generate a seismic signal which is transmitted into the earth. A portion of this signal is reflected from reflecting interfaces within the earth back toward the surface of the earth where it is received by detector stations positioned to receive the reflected signals. The detector stations are usually comprised of a group of geophones which generate electrical signals in response to received seismic signals. The geophones are electrically connected with seismic recording instruments for recording the electrical signals. A recording of one seismic channel is referred to as a trace or seismic trace. When the trace is recorded in analog form on a magnetic tape there is a continuous record written on the tape of an output voltage of a seismic amplifier used in conjunction with the recording of the electrical signals generated by the geophones. When processed in analog form these electrical signals are operated upon for example by filtering to present them in form for use by geophysicists. With the event of digital recording of seismic data a discontinuous record of the signal is written that measures the seismic amplifier output voltage only at discrete intervals. The digitally recorded data may be operated upon to present the data in form for use by geophysicists. Reference may be had to "A Pictorial Digital Atlas", 1966 Edition, prepared by Staff Members of United Geophysical Corporation, and presented at the 36th Annual Meeting of the SEG, Houston, Texas, November 1966, for a better understanding of digital recording and analysis and processing of seisimic signals.

There are many different types of seismic energy sources employed in seismic prospecting. In general, these energy sources may be classified in two general classes, the first being those by which an impulse signal is transmitted into the earth, for example by the use of explosives; and the second being those by which vibrational energy is transmitted by a continuous or semicontinuous process into the earth, for example by the use of hydraulic vibrators to generate a wave train of controlled frequencies.

In U.S. Pat. No. 2,688,124 to Doty et al. there is described a method of determining the travel time, between spaced first and second points, of a unique signal which is non-repetitive during a period which is at least as long as such travel time. The steps of this method are as follows:

(a) transmit such a signal from the first point,
(b) provide a counterpart of the transmitted signal,
(c) multiply at least a substantial portion of the total transmitted vibration energy which is received at the second point by the counterpart signal,
(d) integrate for a substantial period the product of the multiplication, and alter the phase relation between the counterpart signal and the transmitted signal during successive integration periods, and
(e) record the values derived from the integration whereby the out-of-time phase relation of the counterpart signal with respect to the transmitted signal at the first point, which yields the greatest value from such integration, may be used as the parameter of the travel time of the unique signal between the points.

Doty et al. teaches that the energy source or tranducer used to generate the initial unique signal which is non-repetitive for substantial periods may be of any type which can transmit a harmonic compressional wave into the earth, for instance, with a controllable frequency and substantially constant amplitude.

In U.S. Pat. No. 3,689,874 to Foster et al. there is described an invention which relates to the processing of geophysical data to compensate for the effect of distortion introduced in obtaining the data and, more particularly, relates to a type of inverse filtering wherein the geophysical data are processed to obtain the inverse filter and wherein the inverse filter is then applied to the geophysical data in a manner which broadens the frequency band of the geophysical data. Geophysical data includes distortion which often obscures the desired characteristics of the geological formations and in seismic exploration this distortion often takes the form of multiple reflections, commonly referred to as ghosts or reverberations.

Foster et al. characterized the distortion present in seismic data by an operation which separates the distortion component from the component representing the characteristics of the geological formations. The inverse of the distortion filter is then obtained and this inverse distortion filter is applied to the geophysical data to produce an output which emphasizes the true characteristics of the geological formations. This output is applied to a filter which has specified desirable properties such as a broad flat signal spectrum in the seismic band. This filter, which is referred to as the D filter, renders the final output a good estimate of the geophysical data which would have been produced in the absence of the distortion.

Foster et al. further teaches how to characterize the distortion present in a seismic trace and then, having characterized the distortion, how to generate an inverse filter which is the inverse of the distortion. Foster et al. then applies the seismic trace to the inverse filter and obtains an output that represents primarily the reflectivity of the formations from which the seismic data was obtained. The output of the seismic data is then applied to the D filter which introduces the desired shot pulse to produce a signal which approximates the signal which would have been produced by a desired shot pulse interacting with the reflectivity of the earth in the absence of any distortion.

The technique of Foster et al. is an example of a deconvolution technique wherein seismic data is deconvolved with a minimum phase inverse operator. In deconvolving geophysical data and in particular in deconvolving geophysical data with a minimum phase inverse operator there may be introduced into the data a phase distortion. The present invention provides a technique for correcting such phase distortion in geophysical data.

SUMMARY OF THE INVENTION

This invention is directed to an automatic method of processing in an automatic data processing machine deconvolved seismic traces to correct for phase distortion introduced in deconvolving the seismic traces. A signal representing the minimum phase inverse of the signal pulse of the seismic energy applied to the earth in obtaining the geophysical data is generated and is convolved with the signal pulse to obtain a signal representing a function g(t). The time reverse of the signal representing the function g(t) is determined to obtain a signal representing a function h(t) and the signal representing the function h(t) is convolved with signals representing the deconvolved seismic traces to phase correct the traces.

Another aspect of this invention is directed to an automatic data processing system for processing deconvolved seismic traces. There is provided means for generating a signal representing the minimum phase inverse of a signal pulse and means for convolving the signal representing the minimum phase inverse of the signal pulse with the signal pulse to obtain a signal representing a function g(t). Also provided is a means for generating a signal representing the time reverse of the signal representing a function g(t) to obtain a signal representing a function h(t) and there is further provided a means for convolving the signal representing a function h(t) with the signals representing the deconvolved seismic traces to phase correct the seismic traces.

DESCRIPTION OF THE PREFERRED EMBODIMENTS

This invention is directed to a method and apparatus for removing phase distortion from seismic data. The method of this invention is an automatic method of processing in an automatic data processing machine deconvolved seismic data or traces to phase correct the seismic traces. The apparatus of this invention is an automatic data processing system for processing deconvolved seismic traces. This invention is also directed to a new use of an automatic data processing machine.

In carrying out seismic prospecting, seismic traces or data are gathered in the field and thereafter processed to improve the quality of the data and to present the data in suitable form for use by geophysicists for determining the properties and structures of subterranean earth formations. A process which is commonly applied to seismic data is a deconvolution process. Deconvolution is a form of filtering which is used to nullify objectionable effects of some earlier filter action. Deconvolution is used for example in removing reverberations, multiples, and ghosts from seismic data. However, in deconvolving seismic data, phase distortion may be introduced into the data. This invention is concerned with correcting the data to compensate for the phase distortion.

In accordance with this invention a signal representing the minimum phase inverse of the signal pulse of the seismic energy applied to the earth in obtaining the seismic data is generated and is convolved with the signal pulse to obtain a signal representing a function g(t). The time reverse of the signal representing a function g(t) is generated to obtain a signal representing a function h(t) and the signal representing a function h(t) is convolved with signals representing deconvolved seismic traces to phase correct the deconvolved seismic traces.

Figure 1:
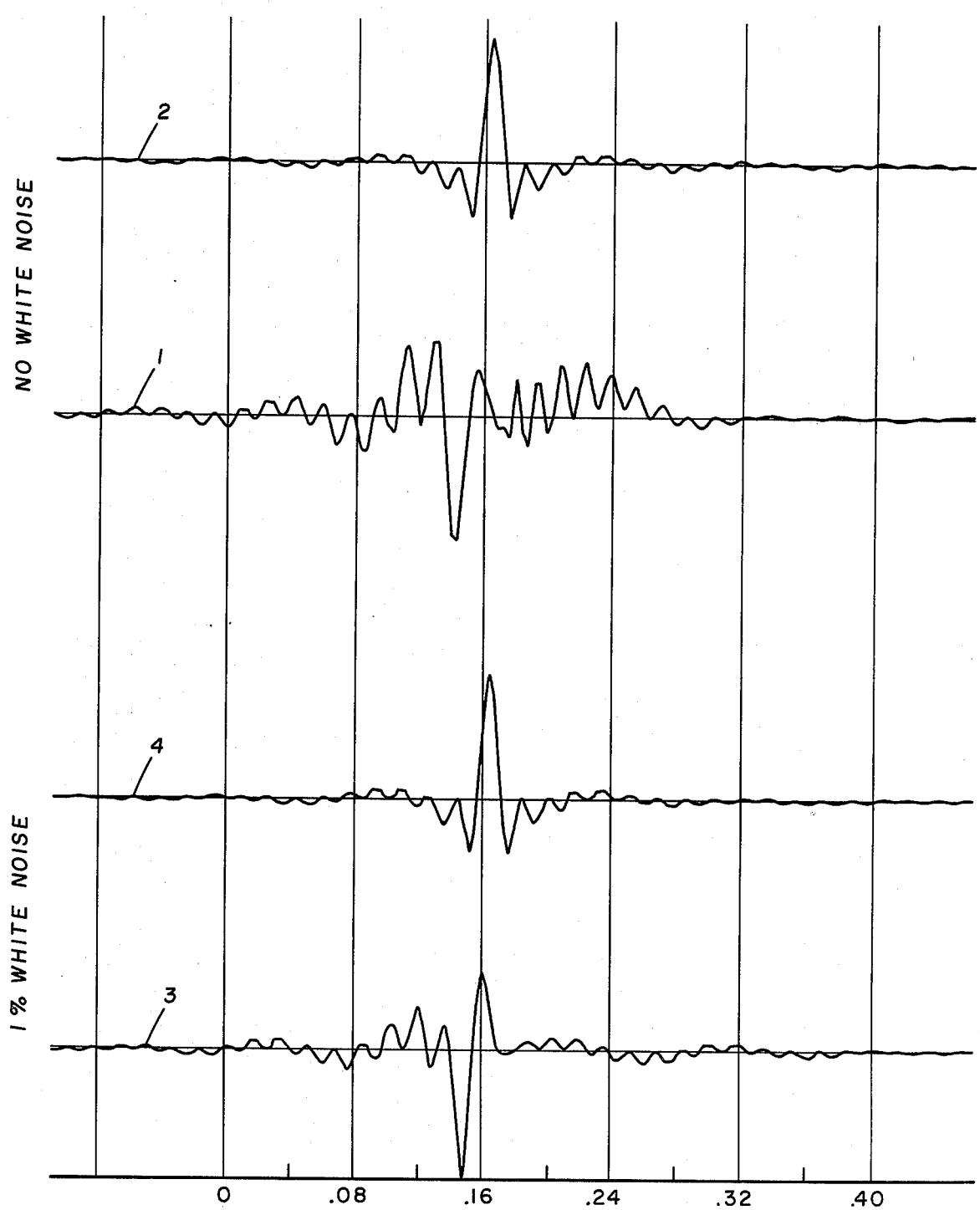
FIG. 1 is a schematic view of a deconvolved seismic trace having phase distortion and the same trace after it has been operated on in accordance with this invention to remove the phase distortion.

This invention is applicable for phase correcting deconvolved seismic traces that originate from a known, obtainable, or estimable signal pulse being introduced into the earth and thereafter detected. This invention is particularly applicable for processing seismic traces which have been deconvolved with a minimum phase inverse operator or filter to remove from the seismic traces phase distortion which was introduced by the filter. This invention is still more particularly applicable for removing phase distortion from deconvolved seismic traces, which seismic traces are obtained by carrying out vibrational seismic exploration methods wherein the seismic input signal applied to the earth has a unique, non-repetitive frequency content of predetermined duration. The predetermined duration of the seismic input signal used in carrying out a vibrational seismic exploration method may be eight seconds, for example, as is indicated by FIG. 1. Such a seismic energy source will hereafter be referred to as a unique seismic energy source and such a signal will hereafter be referred to as a unique signal or sweep. Seismic traces obtained using a unique seismic energy source will hereafter be referred to as unique seismic traces or data.

Figure 4:
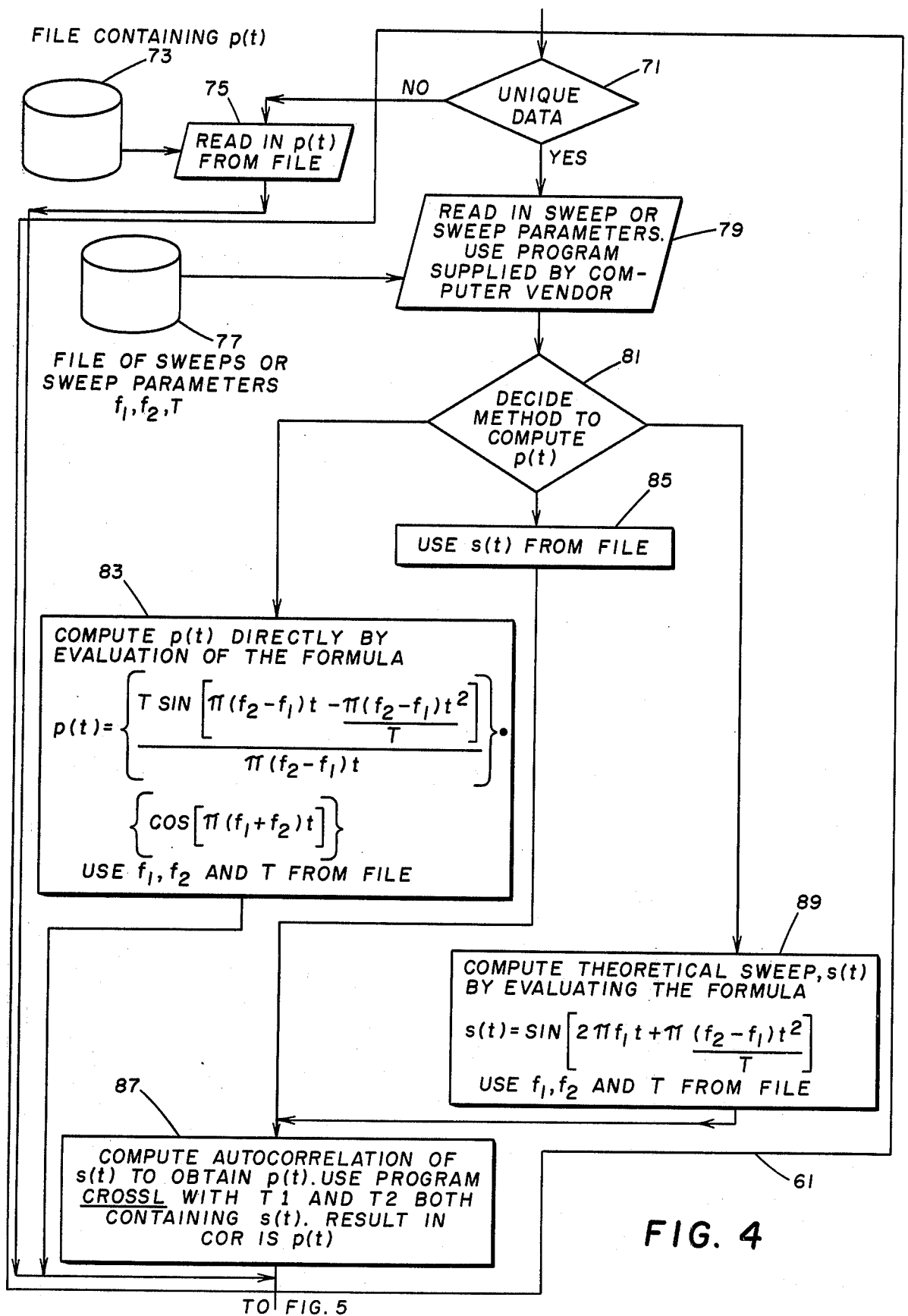
FIG. 4 and FIG. 5 are the first and second parts, respectively, of a detail flow sheet further illustrating this invention.

When a seismic energy source is used that transmits an impulse signal into the earth, the impulse signal may be recorded by locating a seismic detector in the vicinity of the energy source and recording the impulse signal. The signal pulse of this impulse signal is the recorded impulse signal and thus is known. The unique signal pulse of a unique signal or sweep must, however, be obtained or estimated from the unique signal or characteristics of the unique signal. Three methods of obtaining the unique signal pulse are illustrated by FIG. 4. By one method the unique signal pulse is obtained at block 83, by another method at blocks 85 and 87, and by a third method at blocks 89 and 87. The term p(t) is hereafter used to mean signal pulse whether it be the signal pulse of an input signal or the unique signal pulse of a unique signal.

Referring to FIG. 1 there are shown four curves representative of unique seismic data traces obtained using an eight-second 10-60 cycles per second unique sweep. The trace 1 is representative of a unique trace which has been recorded, correlated with the unique sweep applied to the earth, and deconvolved using a minimum phase deconvolution process, which process inherently introduces phase distortion into the data. Curve 2 is representative of the trace of curve 1 after having been processed in accordance with this invention to remove the phase distortion. By comparison of curves 1 and 2 it is seen that the phase of the energy is reversed and shifted in time. Curves 3 and 4 are comparable with curves 1 and 2, respectively, with the exception that 1 percent white noise has been added to the unique data in accordance with an embodiment of this invention. White noise is considered to be random energy containing all frequency components in equal proportions within the band-width; phases are random.

Figure 2:
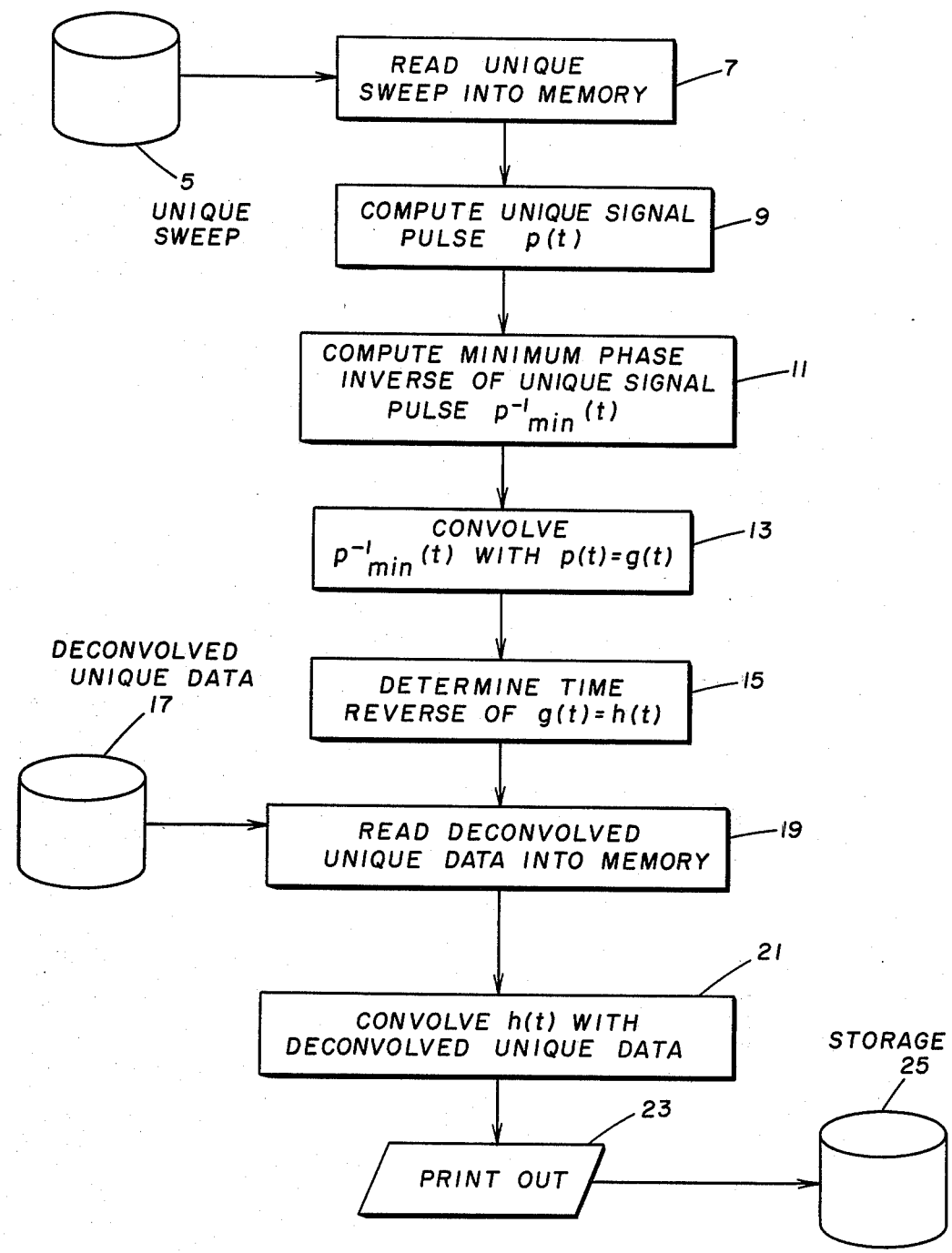
FIG. 2 is a flow sheet illustrating the method of this invention.

With reference to FIG. 2 there is shown a schematic block diagram illustrating the method of this invention as applied to the processing of unique data. The unique sweep is taken from storage 5, normally disc or tape storage, and inputted into the computer memory 7. The unique signal pulse or unique pulse p(t) is computed at block 9 and the minimum phase inverse of the unique pulse $p_{min}^{-1}(t)$ is computed at block 11. The minimum phase inverse of the unique pulse $p_{min}^{-1}(t)$ is convolved with the unique pulse p(t) to obtain a function g(t) at block 13. At block 15 there is determined a function h(t) which is the time reverse of g(t). The function h(t) is an operator which when later convolved with the deconvolved unique data corrects the data for phase distortion. The deconvolved unique data is taken from storage 17 and read into the computer memory at block 19. At block 21 the function h(t) is convolved with the deconvolved unique data to correct the data for phase distortion. The corrected data may then be printed out at block 23 or stored in storage 25.

At storage 5 the unique sweep was indicated as being in storage and being read into the computer memory. This is normally the case when the unique sweep has been recorded with the field data. However, at times only the unique sweep parameters, starting frequency, ending frequency, and time duration of the unique sweep may be recorded in storage 5. Having the unique sweep parameters, the unique pulse p(t) may be computed at block 9 by autocorrelating a theoretical unique sweep. The theoretical unique sweep s(t) may be computed by evaluating the formula $$s(t) = \sin\left[2\pi f_1 t + \frac{\pi(f_2 - f_1)t^2}{T}\right]$$

using the starting frequency $f_1$, the ending frequency $f_2$, and the time duration T of the unique sweep from the storage 5.

The unique pulse p(t) may also be computed directly using the unique sweep parameters $f_1$, $f_2$, and T by evaluating the formula $$p(t) = \left(T \sin\left[\pi(f_2 - f_1)t - \frac{\pi(f_2 - f_1)t^2}{T}\right]\right)$$

$$(\cos[\pi(f_1 + f_2)t]).$$

A suitable approximation of the minimum phase inverse of the unique pulse is the least squares optimum prediction error filter for unit prediction distance. This filter is also referred to as a spiking filter and a predictive deconvolution (for unit prediction distance) filter.

The minimum phase inverse of the unique pulse may also be determined for a particular signal p(t) by computing the autocorrelation of p(t) referred to as r(t) and solving the following symmetric Toeplitz matrix equation:

$$\begin{bmatrix} r_0 r_1 r_2 \ldots r_n \\ r_1 r_0 r_1 \ldots r_{n-1} \\ r_2 r_1 r_0 \ldots r_{n-2} \\ \vdots \\ \vdots \\ r_n \ldots r_0 \end{bmatrix} \begin{bmatrix} a_0 \\ a_1 \\ \vdots \\ \vdots \\ \vdots \\ a_n \end{bmatrix} = \begin{bmatrix} \alpha \\ 0 \\ 0 \\ \vdots \\ \vdots \\ 0 \end{bmatrix}$$

where:
$r_k = r(t_k)$,
$t_k =$
$k\Delta t$ for $k = 0, 1, \ldots n$
$\Delta t =$ sample interval
$a_k$, $k = 0, 1, \ldots n$ is the required minimum phase inverse filter, $p_{min}^{-1}(t)$ (with $a_0 = 1$)
$\alpha =$ expected error for the solution of the Toeplitz equation.

This is a set of $n+1$ equations with $N+1$ unknowns, where the unknowns are: $\Delta$, $a_1$, $a_2$, $\ldots a_n$. The $a_0$ is known and equals 1.

A general purpose digital computer of sufficient capacity for processing seismic data may be used in carrying out the method of this invention. A general purpose digital computer may be programmed so that deconvolved seismic data may be inputted into the programmed computer and phase corrected deconvolved seismic data outputted from the computer.

Figure 3:
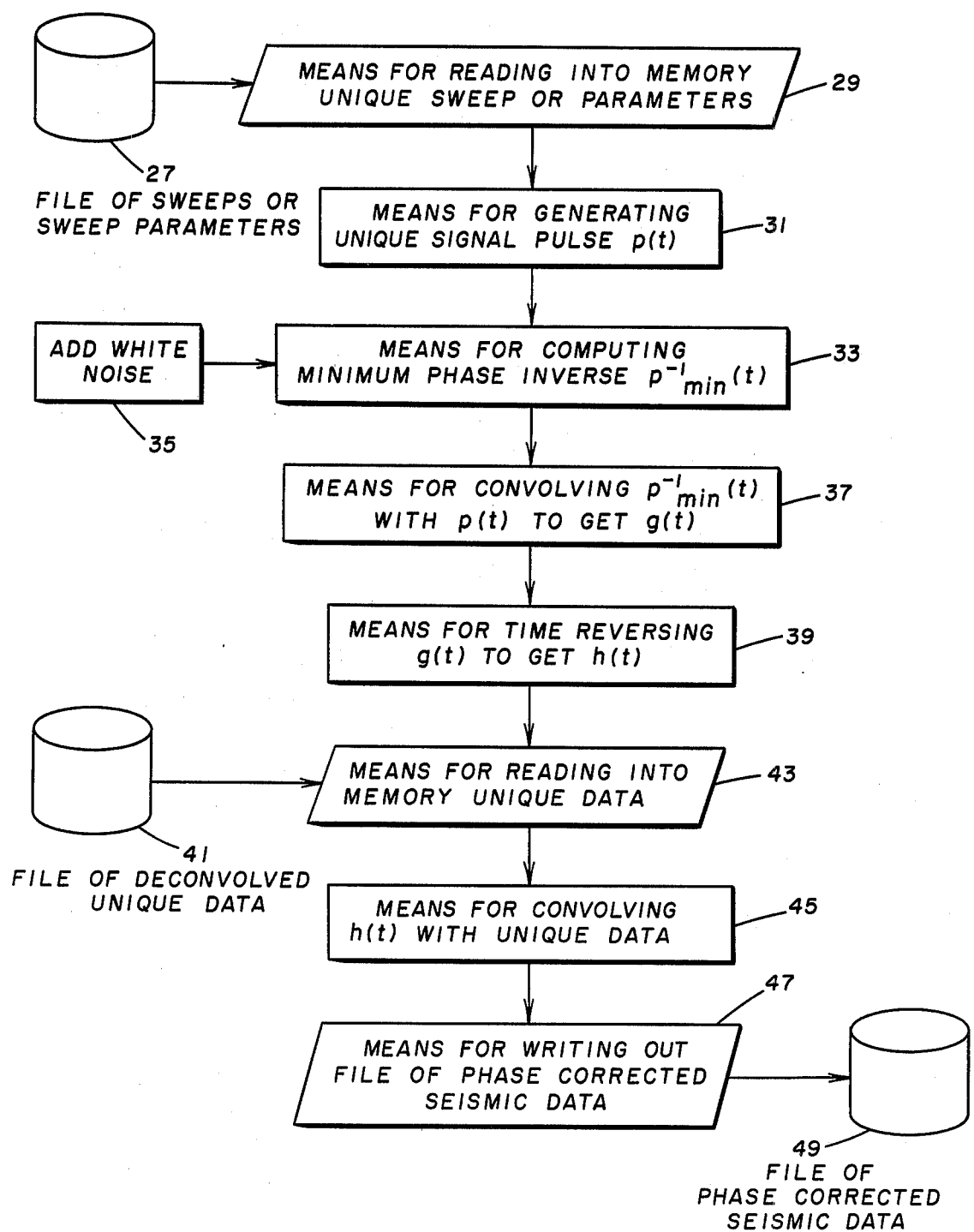
FIG. 3 is a block diagram illustrating the system of this invention.

With reference to FIG. 3 there is shown a block diagram of an automatic data processing machine for processing deconvolved unique data. As there shown, block 27 illustrates a file of unique sweeps or sweep parameters which may be inputted into the computer. Block 29 provides for a means for reading into memory the unique sweep or parameters. Block 31 provides a means for generating a unique pulse p(t) and block 33 provides a means for computing the minimum phase inverse $p_{min}^{-1}(t)$ of the signal received from block 31. White noise from block 35 may be added to the machine at block 33. Block 37 provides for a means for convolving $p_{min}^{-1}(t)$ with p(t) to get a function g(t) and block 39 provides a means for time reversing g(t) to get another function h(t). A file of deconvolved unique data is inputted from block 41 into block 43 which provides a means for reading into memory the unique data. Block 45 provides a means for convolving h(t) with the unique data and thereby correcting the data for phase distortion. The corrected seismic data may then be written or printed out at block 47 or stored at block 49.

From the foregoing it will be apparent that the method of the present invention can be practiced with the use of several well-known types of data processing machines or computers. One particular machine which is suitable for use is supplied by Control Data Corporation under the general model designation 6600, and includes the following components:
Central Computer, 65K Memory
6608 Disc System
6602 Console Display
6681 Data Channel Converter
3228 Magnetic Tape Controller
607 Magnetic Tape Transport
3447 Card Reader Controller
405 Card Reader
3256 Line Printer Controller, and 501 Line Printer.

Appended hereto are printouts of FORTRAN subroutines for autocorrelating a unique sweep, s(t), to obtain a signal pulse, p(t) (CROSSL, block 87, FIG. 4); computing r(t), the autocorrelation of p(t) (CROSSL, block 91, FIG. 4); computing the minimum phase inverse $p_{min}^{-1}(t)$ (WHOPF 1, block 95, FIG. 4); convolving $p_{min}^{-1}(t)$ with p(t) to obtain g(t) (FILTM, block 97, FIG. 4); time reversing g(t) to obtain h(t) (MOVER, block 99, FIG. 4); and convolving h(t) with the seismic data to correct the data (FILTM, block 105, FIG. 4). These subroutines are specified in FORTRAN language suitable for use on most digital computers. For a better understanding of the use of FORTRAN statements, reference should be made to "Introduction to FORTRAN: A Program for Self-Instruction", by S. C. Plumb, McGraw-Hill Publishing Company, New York, New York (1964).

Figure 5:
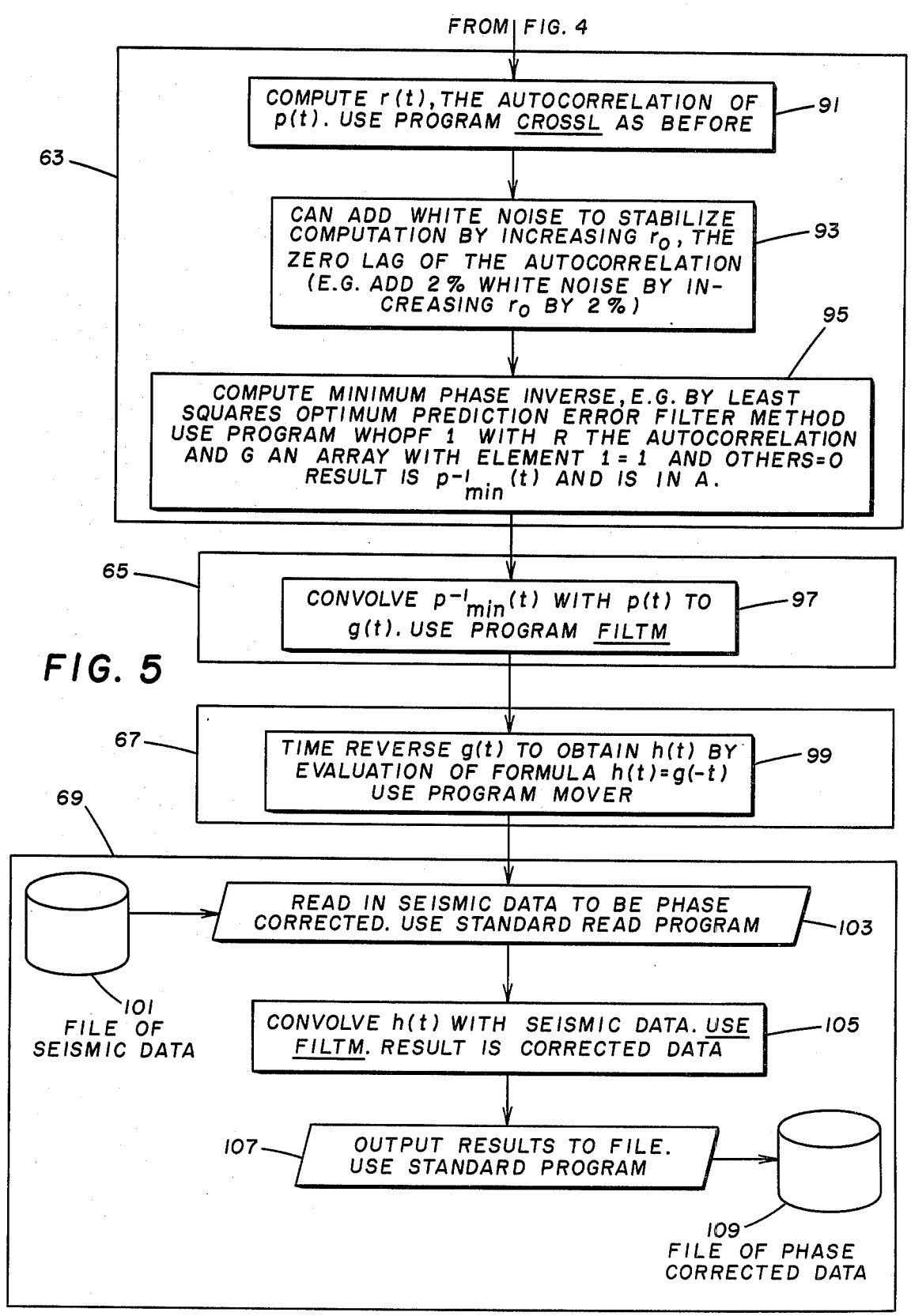

For a more complete understanding of this invention, reference should be made to the detailed flow sheet of this invention of FIGS. 4 and 5. The general steps of this invention are shown by the large blocks of the flow sheet. At large block 61 the signal pulse p(t) is generated. Thereafter, at large block 63 the minimum phase inverse of the signal pulse $p_{min}^{-1}(t)$ is computed. When the signal pulse is known, for example when p(t) has been recorded directly, the block 61 is by-passed and the minimum phase inverse is computed from the known signal pulse. At large block 65 the minimum phase inverse of the signal pulse is convolved with the signal pulse to obtain a function g(t). Thereafter at large block 67 the time reverse of the function g(t) is computed to obtain a function h(t), which function h(t) is the phase correction filter. At large block 69 the function h(t) is operated on the seismic or geophysical data to correct the data by correcting the phase distortion.

Now for a more detailed description of the invention reference is again made to the large block 61. There at block 71 a decision is made as to whether or not the seismic data is unique data. If not, then the file 73 containing the signal pulse p(t) is read into the memory at block 75 from the file 73 and thence $p_{min}^{-1}(t)$ is computed as indicated at large block 63. If the seismic data is unique data, then the sweep or sweep parameters $f_1$, $f_2$, and T are read at block 79 into the computer memory from the file 77. Thereafter, at block 81 a decision is made as to the method to use in computing the signal pulse p(t). Three methods are given which may be used to compute p(t). By one method p(t) may be computed directly as indicated at block 83 by the evaluation of a formula given there. By another method p(t) may be computed by using the unique sweep s(t), block 85, and computing the autocorrelation of s(t), block 87. The program CROSSL may be used to obtain the correct signal pulse p(t) wherein T1 and T2 both contain s(t). By the third method the signal pulse p(t) is computed by computing the theoretical sweep at block 89 by evaluating the formula there given and computing the autocorrelation of the theoretical sweep, block 87.

After obtaining or knowing the signal pulse, the minimum phase inverse of the signal pulse is computed as indicated at large block 63. There at block 91 p(t) is autocorrelated to compute r(t). The program CROSSL may be used for computing r(t). White noise may be added at block 93 to stabilize the computation by increasing $r_0$, the zero lag of the autocorrelation. For example, 2 percent white noise may be added by increasing $r_0$ by 2 percent. The minimum phase inverse is computed at block 95, for example, by the least squares optimum prediction error filter method. The program WHOPF 1 may be used for this computation with R being the autocorrelation and G an array with element 1=1 and the others equal 0.

Thereafter, at block 97 the function g(t) is obtained by convolving $p_{min}^{-1}(t)$ with p(t). The program FILTM may be used to obtain the function g(t). At block 99 a function h(t) is computed by taking the time reverse of g(t). This is done by the evaluation of the formula h(t)=g(−t).

The file of seismic data 101 to be phase corrected is read as block 103 into the computer memory. The data is the phase corrected at block 105 by convolving the function h(t) with the seismic data. The program FILTM may be used for convolving h(t) with the seismic data. The output results are then obtained at block 107. The output results may be displayed (not shown) or filed as indicated at block 107 as a file of phase corrected data in file 109.

APPENDIX

SUBROUTINE CROSSL(T1,LT1,T2,LT2,COR,LC,LAG)

TITLE - CROSSL = CROSSCORRELATION, START AT ANY LAG

COMPUTE CROSSCORRELATION STARTING AT ANY LAG.

----ABSTRACT----

CROSSL COMPUTES THE CROSSCORRELATION OF TWO TIME SERIES OF DIFFERENT LENGTHS STARTING AT ANY LAG. THE SERIES ARE ASSUMED TO BE ZERO OUTSIDE THEIR LENGTH OF DEFINITION. THE COMPUTATION DONE IS $$COR(I) = \sum_J T1(J)*T2(J-LAG-I+1) \quad \text{FOR } I=1,\ldots,LC$$

LANGUAGE - FORTRAN IV

NO ROUTINES REQUIRED

----USAGE----

SAMPLE CALL
```
    CALL CROSSL(T1,LT1,T2,LT2,COR,LC,LAG)
```

INPUTS

T1(I)    I=1,...,LT1. REAL. TIME SERIES FOR CROSSCORRELATION - SEE ABSTRACT.

LT1    INTEGER. LENGTH OF T1.

T2(I)    I=1,...,LT2. REAL. TIME SERIES FOR CROSSCORRELATION - SEE ABSTRACT.

LT2    INTEGER. LENGTH OF T2(I).

LC    INTEGER. LENGTH (NO. OF LAGS) OF CROSSCORRELATION TO COMPUTE - STARTING WITH LAG NUMBER LAG.

LAG    INTEGER. LAG NUMBER OF FIRST VALUE IN COR(I).

OUTPUT

COR(I)    I=1,...,LC. REAL. CROSSCORRELATION AS DESCRIBED IN ABSTRACT.

```
      REAL T1(2),T2(2),COR(2)
      IF(LC.LE.0) GO TO 100
      LL=-LAG+2
      DO 20 I=1,LC
      L1=MAX0(1,I+LAG)-1
      L2=MAX0(LL-I,1)-1
      SUM=0
      LSUM=MIN0(LT1-L1,LT2-L2)
      IF(LSUM.LE.0) GO TO 20
      DO 10 J=1,LSUM
10    SUM=T1(L1+J)*T2(L2+J)+SUM
20    COR(I)=SUM
100   RETURN
      END
```

```
      SUBROUTINE WHOPF1(R,G,F,M,A)
TITLE - WHOPF1 = WIENER-HOPF, VERSION 1
   SOLVE DISCRETE WIENER-HOPF EQUATION

----ABSTRACT----

WHOPF1 SOLVES THE DISCRETE WIENER-HOPF EQUATION
              SUM(RR(I,J)*F(J)=G(I)
               J

WHERE RR(I,J) IS AN AUTOCORRELATION MATRIX WHICH IS A
         SYMMETRIC TOEPLITZ FORM. HENCE
              RR(I,J)=R(ABS(I-J)+1)
         WHERE R(K) IS THE AUTOCORRELATION.

LANGUAGE  - FORTRAN IV

NO ROUTINES REQUIRED

----USAGE----

SAMPLE CALL
     CALL WHOPF1(R,G,F,M,A)

INPUTS

R(I)      I=1,M    AUTOCORRELATION.

G(I)      I=1,M    RIGHTHAND SIDE OF EQUATION (CROSSCORRELATION).

M                  LENGTH OF R,G,A, AND DESIRED FILTER, F.

A(I)      I=1,M    WORK SPACE.

OUTPUTS

F(I)      I=1,M    FILTER.

A(I)      I=1,M    PREDICTION ERROR OPERATOR.

REAL R(2),G(2),F(2),A(2)
    A(1)=1.
    ALPHA=R(1)
    F(1)=G(1)/ALPHA
    DO 100 J=2,M
    F(J)=0.
    A(J)=0.
    E=0.
    H=0.
    K=J+1
    DO 20 I=2,J
    E=E+R(I)*A(K-I)
 20 H=H+R(I)*F(K-I)
    BETA=-E/ALPHA
    ALPHA=ALPHA+BETA*E
    GAMMA=(G(J)-H)/ALPHA
```

```
      N=J/2
      DO 30 I=1,N
      TEMP=A(K-I)+BETA*A(I)
      A(I)=A(I)+BETA*A(K-I)
      A(K-I)=TEMP
      F(I)=F(I)+GAMMA*TEMP
30    F(K-I)=F(K-I)+GAMMA*A(I)
      IF(2*N.EQ.J) GO TO 100
      A(N+1)=(1.+BETA)*A(N+1)
      F(N+1)=F(N+1)+GAMMA*A(N+1)
100   CONTINUE
      RETURN
      END

SUBROUTINE FILTM(T,LT,F,LF,G,LG,MESH)
```

TITLE - FILTM = FILTER, START AT ANY MESH

FILTER STARTING AT ANY MESH, CONTINUING FOR ANY LENGTH

----ABSTRACT----

FILTM CONVOLVES A FILTER, F , WITH A FUNCTION, T , TO PRODUCE AN OUTPUT, G. THE FILTERING MAY START AT ANY MESH, THAT IS THE FILTER MAY BE UNMESHED, PARTLY MESHED, ETC., WITH THE FUNCTION. THIS IS SPECIFIED BY THE PARAMERET MESH. IF MESH=1, THE FILTER IS UNMESHED, I.E. THE FIRST OUTPUT POINT WILL EQUAL F(1)*T(1). IF MESH = LF, THE FILTER LENGTH, THE FILTER AND FUNCTION ARE JUST COMPLETELY MESHED. IF MESH IS ZERO OR NEGATIVE, THE FIRST ABS(MESH+1) OUTPUT POINTS WILL BE ZERO, THE FUNCTION AND FILTER ARE ASSUMED TO BE ZERO OUTSIDE THEIR RANGE OF DEFINITION. THE LENGTH OF THE OUTPUT IS SPECIFIED BY LG, AND THE OUTPUT WILL BE ZERO WHEN LG.GT.LT+LF-MESH, WHERE LT IS THE LENGTH OF THE FUNCTION AND LF IS THE LENGTH OF THE FILTER. THE QUANTITY COMPUTED IS $$G(I) = \sum_J T(J)*F(I-J+MESH)$$

LANGUAGE    - FORTRAN IV
STORAGE     -

NO SPECIAL ROUTINES REQUIRED.

----USAGE----

SAMPLE CALL
```
      CALL FILTM(T,LT,F,LF,G,LG,MESH)
```

INPUTS

T(I)　　　I=1,LT. REAL. FUNCTION TO BE FILTERED.

LT　　　　INTEGER. LENGTH OF T(I).

F(I)　　　I=1,LF. REAL. FILTER.

LF　　　　INTEGER. LENGTH OF FILTER.

LG　　　　INTEGER. LENGTH OF OUTPUT, G(I).

MESH　　　INTEGER. SPECIFIES MESH, THE POINT INTO THE FUNCTION
　　　　　　T(I) WHERE THE FILTER STARTS, SEE ABSTRACT.

OUTPUT

G(I)　　　I=1,LG. REAL. OUTPUT OF FILTER OPERATION ON T(I).

```
      REAL T(2),F(2),G(2)
      IF(LG.LE.0) GO TO 100
      LAG=MESH-LF
      LL=-LAG+2
      KK=LF+2
      DO 20 I=1,LG
      L1=MAXO(1,I+LAG)-1
      L2=KK-MAXO(LL-I,1)
      SUM=0.
      LSUM=MINO(LT-L1,L2-1)
      IF(LSUM.LE.0) GO TO 20
      DO 10 J=1,LSUM
10    SUM=T(L1+J)*F(L2-J)+SUM
20    G(I)=SUM
100   RETURN
      END

SUBROUTINE MOVER(SOURCE,DEST,LEN)
```

TITLE - MOVER = MOVE AND REVERSE

MOVE AND REVERSE A VECTOR

----ABSTRACT----

MOVER MOVES AND REVERSES A VECTOR (ONE DIMENSIONAL
　　　　　　ARRAY) WITH ANY OVERLAP OF SOURCE AND DESTINATION
　　　　　　PERMITTED.

LANGUAGE　　　- FORTRAN IV

NO ROUTINES REQUIRED

----USAGE----

SAMPLE CALL
```
    CALL MOVER(SOURCE,DEST,LEN)
```

INPUT

SOURCE(I) I=1,...,LEN.   VECTOR TO BE MOVED AND REVERSED.

LEN       INTEGER.  LENGTH OF SOURCE(I) AND DEST(I).

OUTPUT

DEST(I)   I=I,...,LEN.  CONTAINS SOURCE(I) IN REVERSE ORDER. I,E.
            DEST(I)=SOURCE(LEN-I+1). ANY OVERLAP OF SOURCE(I) AND
            DEST(I) IS PERMITTED. E.G. EQUIVALENCE(SOURCE,DEST(2)),
            OR EQUIVALENCE(SOURCE(2),DEST), ETC.

```
      REAL SOURCE(2),DEST(2)
      IF(LEN.LE.0) GO TO 60
      ILAP=LOCF(SOURCE)-LOCF(DEST)
      IALAP=IABS(ILAP)
      K2=0
      L2=LEN+1
      IF(IALAP.GE.LEN)GO TO 40
      K1=MAX0(ILAP,0)
      L1=LEN+1-K1
      IF(ILAP.GE.0)GO TO 20
      K2=LEN+ILAP
      L2=1-ILAP
   20 CONTINUE
      DO OVERLAPPED REGION
      LAP=(LEN-IALAP)/2
      IF(LAP.EQ.0)GO TO 40
      DO 30 I=1,LAP
      T=DEST(K1+I)
      DEST(K1+I)=SOURCE(L1-I)
   30 SOURCE(L1-I)=T
      IF(ILAP.EQ.0)GO TO 60
      DO NON-OVERLAPPED REGION
   40 NLAP=MIN0(IALAP,LEN)
      DO 50 I=I,NLAP
   50 DEST(K2+I)=SOURCE(L2-I)
   60 RETURN
      END
```

I claim:

1. An automatic method of processing in an automatic data processing machine signals representing deconvolved seismic traces obtained by applying to the earth seismic energy, the signal pulse of which is known, comprising:
   (a) generating a signal representing the minimum phase inverse of said signal pulse;
   (b) convolving said signal representing the minimum phase inverse of said signal pulse with said signal pulse to obtain a signal representing a function g(t);
   (c) generating a signal representing the time reverse of said signal representing a function g(t) to obtain a signal representing a function h(t); and
   (d) convolving said signal representing a function h(t) with said signals representing deconvolved seismic traces to phase correct said deconvolved seismic traces.

2. An automatic method of processing in an automatic data processing machine signals representing deconvolved seismic traces obtained by applying to the earth a seismic input signal having a unique, non-repetitive frequency content of predetermined duration, comprising:
   (a) generating a signal representing a unique signal pulse;
   (b) generating a signal representing the minimum phase inverse of said unique signal pulse;
   (c) convolving said signal representing the minimum phase inverse of said unique signal pulse with said unique signal pulse to obtain a signal representing a function g(t);
   (d) generating a signal representing the time reverse of said signal representing a function g(t) to obtain a signal representing a function h(t); and
   (e) convolving said signal representing a function h(t) with said signals representing deconvolved seismic traces to phase correct said deconvolved seismic traces.

3. The method of claim 2 wherein said unique signal pulse is generated by autocorrelating said seismic input signal having a unique, non-repetitive frequency content of predetermined duration.

4. The method of claim 2 wherein said unique signal pulse is generated by autocorrelating a theoretical unique signal, said theoretical unique signal being generated by using the starting frequency, ending frequency, and time duration of said seismic input signal having a unique, non-repetitive frequency content of predetermined duration.

5. The method of claim 4 wherein said theoretical unique signal is obtained by solving the formula $$s(t) = \sin\left[2\pi f_1 t + \frac{\pi(f_2 - f_1)t^2}{T}\right]$$

where:
s(t) = theoretical unique signal; r(t) = 0 except when t is taken between 0 and T;
$f_1$ = starting frequency of a seismic input signal having a unique, non-repetitive frequency content of predetermined duration applied to the earth;
$f_2$ = ending frequency of said seismic input signal having a unique, non-repetitive frequency content of predetermined duration applied to the earth;
T = time duration of said seismic input signal having a unique, non-repetitive frequency content of predetermined duration applied to the earth; and
t = time.

6. The method of claim 2 wherein said unique signal pulse is generated by solving the formula:

$$p(t) = \left(\frac{T \sin\left[\pi(f_2 - f_1)t - \frac{\pi(f_2 - f_1)t^2}{T}\right]}{\pi(f_2 - f_1)t}\right)$$

$$(\cos[\pi(f_1 + f_2)t]).$$

where:
p(t) = unique signal pulse,
$f_1$ = starting frequency of a seismic input signal having a unique, non-repetitive frequency content of predetermined duration applied to the earth;
$f_2$ = ending frequency of said seismic input signal having a unique non-repetitive frequency content of predetermined duration applied to the earth;
T = time duration of said seismic input signal having a unique, non-repetitive frequency content of predetermined duration applied to the earth, and
t = time.

7. The method of claim 2 wherein said minimum phase inverse of said unique signal pulse is a least squares optimum prediction error filter for unit prediction distance.

8. The method of claim 2 wherein said minimum phase inverse of said unique signal pulse is determined by:
   (a) computing the autocorrelation r(t) of said unique signal pulse; and
   (b) solving the matrix equation $$\begin{bmatrix} r_0 r_1 r_2 \cdots r_n \\ r_1 r_0 r_1 r_2 \cdots r_{n-1} \\ r_2 r_1 r_0 \cdots \\ \vdots \\ r_n \cdots r_0 \end{bmatrix} \begin{bmatrix} a_0 \\ a_1 \\ \vdots \\ a_n \end{bmatrix} = \begin{bmatrix} \alpha \\ 0 \\ \vdots \\ 0 \end{bmatrix}$$

where:
$r_k = r(t_k)$,
$t_k = k\Delta t$ for k = 0, 1, ... n, $\Delta t$ = sample interval,
$a_k$, k = 0, 1, ... n is the required minimum phase inverse filter, $p_{min}^{-1}(t)$ (with $a_0 = 1$),
$\alpha$ = expected error for the solution of the Toeplitz equation.

9. An automatic data processing system for processing signals representing deconvolved seismic traces comprising:
   (a) means for generating a signal representing the minimum phase inverse of a signal pulse;
   (b) means for convolving said signal representing the minimum phase inverse of said signal pulse with said signal pulse to obtain a signal representing a function g(t);
   (c) means for generating a signal representing the time reverse of said signal representing a function g(t) to obtain a signal representing a function h(t); and (d) means for convolving said signal representing a function h(t) with said signals representing deconvolved seismic traces to phase correct said deconvolved seismic traces.

10. An automatic data processing system for processing signals representing deconvolved seismic traces obtained by applying to the earth a seismic input signal having a unique, non-repetitive frequency content of predetermined duration, comprising:
   (a) means for generating a unique signal pulse;
   (b) means for generating a signal representing the minimum phase inverse of said unique signal pulse;
   (c) means for convolving said signal representing the minimum phase inverse of said unique signal pulse with said unique signal pulse to obtain a signal representing a function g(t);
   (d) means for generating a signal representing the time reverse of said signal representing a function g(t) to obtain a signal representing a function h(t); and
   (e) means for convolving said signal representing a function h(t) with said signals representing deconvolved seismic traces to phase correct said deconvolved seismic traces.

11. In the processing of signals representing deconvolved seismic traces obtained by applying to the earth a seismic input signal having a unique, non-repetitive frequency content of predetermined duration, the new use of an automatic data processing machine, said machine being interconnected to include:
   (a) a correlator;
   (b) a means for determining a signal representing the minimum phase inverse of a unique signal pulse;
   (c) a convolver;
   (d) a means for determining a signal representing the time reverse of a function;
said new use comprising:
   (1) applying a signal representing said seismic input signal having a unique, non-repetitive frequency content of predetermined duration to said correlator and autocorrelating said signal representing said seismic input signal having a unique, non-repetitive frequency content of predetermined duration to generate a unique signal pulse;
   (2) applying said unique signal pulse to said means for determining a signal representing the minimum phase inverse of a unique signal pulse and generating a signal representing the minimum phase inverse of said unique signal pulse;
   (3) applying to said convolver said signal representing the minimum phase inverse of said unique signal pulse and said unique signal pulse and convolving said signal representing the minimum phase inverse of said unique signal pulse with said unique signal pulse to obtain a signal representing a function g(t);
   (4) applying said signal representing a function g(t) to said means for determining a signal representing the time reverse of a function and obtaining a signal representing a function h(t); and
   (5) applying to said convolver said signal representing a function h(t) and said signals representing said deconvolved seismic traces and convolving said signal representing a function h(t) with said signals representing said deconvolved seismic traces to phase correct said deconvolved seismic traces.

12. A method of producing phase corrected seismic traces from deconvolved field-recorded seismic traces, the field-recorded seismic traces having been obtained by applying to the earth seismic energy, the signal pulse of which is known, said method comprising:
   (a) generating a signal representing the minimum phase inverse of the signal pulse;
   (b) convolving said signal with said signal pulse to produce a function g(t);
   (c) time reversing said function g(t) to obtain a second function h(t); and
   (d) applying said deconvolved field-recorded seismic traces to a filter having characteristics represented by said function h(t) to produce said phase corrected seismic traces.

13. The metod of claim 12 further comprising recording said phase corrected seismic traces.

* * * * *